(12) United States Patent
Ershov

(10) Patent No.: US 7,979,370 B1
(45) Date of Patent: Jul. 12, 2011

(54) NEURAL NETWORK FOR ELECTRONIC SEARCH APPLICATIONS

(75) Inventor: Alexander V. Ershov, Sergiev Posad (RU)

(73) Assignee: Dranias Development LLC, Wilmington, DE (US)

( * ) Notice: Subject to any disclaimer, the term of this patent is extended or adjusted under 35 U.S.C. 154(b) by 22 days.

(21) Appl. No.: 12/362,017

(22) Filed: Jan. 29, 2009

Related U.S. Application Data

(63) Continuation of application No. 11/468,048, filed on Aug. 29, 2006, now Pat. No. 7,496,548.

(60) Provisional application No. 60/719,976, filed on Sep. 26, 2005.

(51) Int. Cl.
*G06F 15/18* (2006.01)
*G06N 3/04* (2006.01)

(52) U.S. Cl. ................ 706/20; 706/18; 706/31

(58) Field of Classification Search ............. 706/20
See application file for complete search history.

(56) References Cited

OTHER PUBLICATIONS

Hämäläinen et al., TUTNC: a general purpose parallel computer for neural network computations, 1995.*
Shmelev et al., Equilibrium Points of Single-Layered Neural Networks with Feedback and Applications in the Analysis of Text Documents, 2005.*
Bengio et al., "A Neural Probabilistic Language Model," Journal of Machine Learning Research (3) 2003 pp. 1137-1155.
K.L. Kwok, "A Neural Network for Probabilistic Information Retrieval," Western Connecticut State University, 1989, pp. 21-30.
Qin He, "Neural Network and Its Application in IR," Graduate School of Library and Information Science, University of Illinois at Urbana-Champaign Spring, 1999, 31 pages.

* cited by examiner

*Primary Examiner* — Jeffrey A Gaffin
*Assistant Examiner* — Nathan H Brown, Jr.

(57) ABSTRACT

A system for information searching includes a first layer and a second layer. The first layer includes a first plurality of neurons each associated with a word and with a first set of dynamic connections to at least some of the first plurality of neurons. The second layer include a second plurality of neurons each associated with a document and with a second set of dynamic connections to at least some of the first plurality of neurons. The first set of dynamic connections and the second set of dynamic connections can be configured such that a query of at least one neuron of the first plurality of neurons excites at least one neuron of the second plurality of neurons. The excited at least one neuron of the second plurality of neurons can be contextually related to the queried at least one neuron of the first plurality of neurons.

30 Claims, 8 Drawing Sheets

NEURAL NETWORK FOR ELECTRONIC SEARCH APPLICATIONS

CROSS-REFERENCE TO RELATED APPLICATIONS

This application is a continuation of U.S. patent application Ser. No. 11/468,048, filed on Aug. 29, 2006, entitled NEURAL NETWORK FOR ELECTRONIC SEARCH APPLICATIONS, which is a non-provisional of U.S. Provisional Patent Application No. 60/719,976, filed on Sep. 26, 2005, entitled NEURAL NETWORK FOR ELECTRONIC SEARCH APPLICATIONS, which are incorporated by reference herein in their entirety.

BACKGROUND OF THE INVENTION

1. Field of the Invention

The present invention relates to the use of neural networks in information searching.

2. Description of the Related Art

The problem of search, in the context of networks and electronic storage media, has become increasingly important in recent years. For example, between the vast amounts of information available on the Internet, corporate networks, individual users desktops, frequently the information sought by the user often exists somewhere. However, the question becomes: how to deliver that information to the user, given the frequently ambiguous and contradictory language constructs, and without imposing an undue burden on the user. Furthermore, the amount of information on the Internet and the number of new users inexperienced at web searching are both growing rapidly.

Search engines attempt to return hyperlinks to web pages that presumably contain information in which a user is interested. Generally, search engines base their determination of the user's interest on search terms (called a "search query") entered by the user. The aim of the search engine is to provide links to high quality, relevant results to the user based on the search query. Typically, the search engine accomplishes this by matching the terms in the search query to a corpus of pre-stored web pages. Web pages that contain the user's search terms are "hits" and are returned to the user.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance or importance of the web page. Determining appropriate scores can be a difficult task. For one thing, the importance of a web page to the user is inherently subjective and depends on the user's interests, knowledge, and attitudes.

There is, however, much that can be determined objectively about the relative importance of a web page. Conventional methods of determining relevance are based on the contents of the web page, or on assigning a degree of importance to a web page based on the link structure of the web page.

The overriding goal of a search engine is to return the most desirable set of links for any particular search query. Thus, it is desirable to improve the ranking algorithm used by search engines and to therefore provide users with better search results.

Many popular search engines, such as those available from Google, Microsoft, Yahoo, etc. utilize an indexing system for identifying documents available on the Internet, identifying words in those documents, creating an index of those words, and then responding to user queries by analyzing the index and delivering the documents that (in the view of the search engines) are most relevant to the users query. The problem therefore can be framed in the form of relevance, in other words, how to construct an algorithm that identifies the most relevant document out of what is typically a very large number of documents that contain the search terms. The same problem, on a somewhat smaller scale, exists with documents stored on corporate networks, LANs, WANs, and the individual desktop hard drives.

Various approaches exist to attempt to incorporate the concept of relevance into search engine technology. For example, whether the document is cited in other documents (for example, through hyperlinks that point to that particular document) can be used as one measure of relevance. Other information in the document, or about the document (metadata) can also be used in a determination of relevance.

However, conventional search engine technology suffers from a number of problems. One such problem can be described as "the tyranny of the majority." For example, a search for "apple" using Google will first present to the user documents relating to Apple Computer, even though the user may be searching for documents relating to edible apple (the fruit), or Adam's apple. This problem is due to the linguistic consequence of the fact that many words in the English language (as well as other languages) have multiple meanings, or trigger multiple contexts/associations in people's minds—the "apple" example being one of them.

Therefore, to search for apple cider, the user has to type in "apple cider" as the search parameter. This will place the results relating to apple cider closer to the top of the results presented to the user. However, even here the problem is contextual—all documents that discuss apple cider do not necessarily have to mention the word "cider" (for example, they can discuss drinks made from apple, where it is clear to the reader from the context that "cider" is the drink at issue, but without using the word "cider"), or they can simply discuss "cider," but not mention the word "apple" (but nonetheless be highly relevant to the user).

The concept of neural networks has been in existence for several decades, and it is assumed, for purposes of this description, that the reader is familiar with how neural networks operate. A neural network is essentially defined by two entities—a basic element, called a neuron, and a definition of how the neurons are connected to each other, which is also called neural network topology. The possibility of applying neural networks to the problem of search has been raised repeatedly in the past. The problem, however, has been that researchers have attempted to apply universal neural network architectures to the problem of text search, and the results have been disappointing. The primary reason why neural networks have not been effectively used in text and document searching is therefore topological—"recomputing" the standard neural network is very computationally intensive.

In the context of text searching, a conventional neuron corresponds to a word. Thus, a universal neural network has a basic element (neuron) for every word in the dictionary, and "connections" from each to neuron to every other neuron. Typically such a universal neural network also has weight coefficients on the connections between the words (elements, or neurons). Applying such a neural network to document analysis, it becomes apparent that the computational problem essentially grows exponentially with the number of documents being analyzed. Such a neural network can be readily applied to analysis of a handful of documents, or perhaps a few dozen. However, applying such a neural network to the hundreds of millions (or billions) of documents available on the Internet is an insurmountable problem. Furthermore, advances in computational hardware do not offer a ready solution, since the number of documents that need analysis also continues to grow.

Accordingly, there is a need in the art for a system and method that takes advantage of neural network concepts and efficiently applies them to context-based searching of documents.

SUMMARY OF THE INVENTION

Accordingly, the present invention is related to the use of neural network for information searching that substantially obviates one or more of the disadvantages of the related art.

In one aspect, there is provided a system for information searching that includes (a) a first layer comprising a first plurality of neurons, each of the first plurality of neurons being associated with a word and with a set of connections to at least some neurons of the first layer; (b) a second layer comprising a second plurality of neurons, each of the second plurality of neurons being associated with an object and with a set of connections to at least some neurons of the second layer, and with a set of connections to at least some neurons of the first layer; (c) a third layer comprising a third plurality of neurons, each of the third plurality of neurons being associated with a sentence and with a set of connections to at least some neurons of the third layer, and with a set of connections to at least some neurons of the first layer and to at least some neurons of the second layer; and (d) a fourth layer comprising a fourth plurality of neurons, each of the fourth plurality of neurons being associated with a document and with a set of connections to at least some neurons of the fourth layer, and with a set of connections to at least some neurons of the first layer, to some neurons of the second layer and to at least some neurons of the third layer. A query to the first layer identifies to a user, through the fourth layer, a set of documents that are contextually relevant to the query. Each connection has a corresponding weight. The neurons form a bidirectional neural network.

The documents can be text files, rich text files, MS Word files, pdf files, HTML files, webpages, video and audio files, and image files (for examples, processed through optical character recognition). The documents can be located on, for example, a local drive, a network drive, a LAN, a WAN, and the Internet, or any combination of the above. The contextually relevant documents can be identified by hyperlinks or annotations. In response to input from a user, weights of the connections can change, resulting in a different set of contextually relevant documents.

After a pass, a user can identify a document considered particularly relevant, and wherein the weights of the connections can change, resulting in a different set of contextually relevant documents. A user can identify an object considered particularly relevant, and wherein the weights of the connections can change, resulting in a different set of contextually relevant documents.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
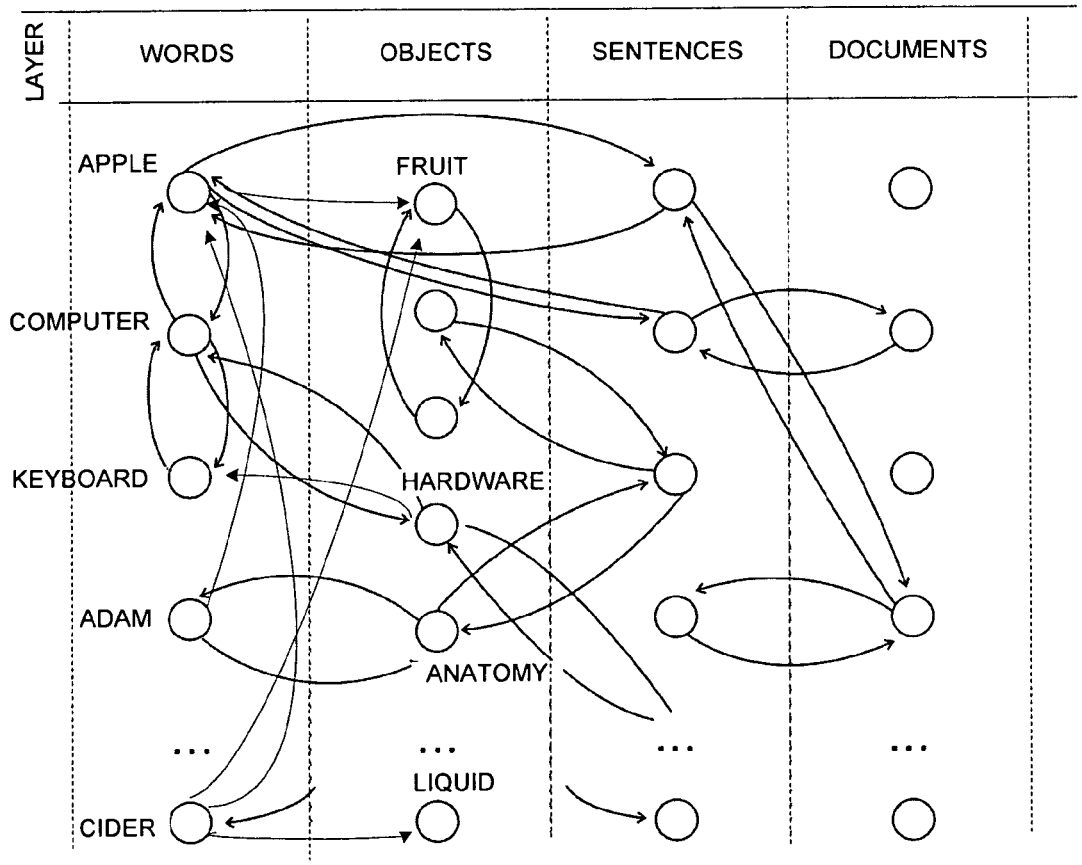
FIG. 1 shows a neural network according to one embodiment of the present invention.

Reference will now be made in detail to the embodiments of the present invention, examples of which are illustrated in the accompanying drawings.

Currently, the most widely known implementation of neural networks is referred to as a "back propagation neural network." This is a multi-layer neural network, where each layer typically consists of a set of neurons, and between each element of each layer there has a connection to every element of a next (or higher) layer. One of the most difficult problems in the field of neural networks is therefore the question of teaching the neural network, which, in mathematical terms, is translated to forming the coefficients of the connections between the neurons. Back propagation networks usually use a multi-cycle approach to gradually reduce the errors in the network, in other words, to gradually change the value of the coefficient of the connections. Note that the user needs to specify both the inputs and the desired outputs of the back propagation neural network. Well-known problems of this approach are a significant investment of time by the user into the learning process, as well as the fact that the "right" result is not guaranteed in a finite number of cycles.

Some of the practical barriers to implementing neural networks in the search field include the difficulty of selection of the proper topology of the network—in other words, identifying what should be the proper inputs, the proper outputs, and how to arrive at the "correct" set of coefficients for the connections between the neurons. Another problem involves the learning process itself—the mechanism of changing the coefficients of the connections needs to be identified, such that it is "guaranteed," in some sense, to ultimately arrive at the right result in a finite number of cycles. Furthermore, any practical implementation of such a neural network for the search application needs to contend with a very large number of elements and connections. This, in turn, places very heavy demands on the computational hardware involved, and, as a practical matter, is today not realizable.

Furthermore, there are a number of difficulties of an algorithmic nature. For example, a typical problem when using neural networks for text searching is over-excitation of the network. Therefore, some algorithm needs to be devised to damp down, or inhibit, the excitation, otherwise, at some point in time, the entire neural network will be excited, or activated, producing a meaningless result.

The approach proposed herein uses neural networks with a certain topology that permits efficient and effective searching of documents. This approach also permits searching of documents that takes into account the context of the keywords and the "meaning" of the words, sentences, documents, clusters of words, documents, and so forth. The approach described herein uses a set of neurons that are not connected to all other neurons on the same layer (or to all other neurons on some other layer), but only to a subset of such neurons. In most cases, this subset will be dramatically less than the total number of neurons in the network.

A basic element of a neural network is, as noted above, a neuron, which has a set of parameters (which may be referred to as a "header"), and a set of connections to other neurons. The header includes all the information necessary for the functioning of the neuron. The set of connections is essentially a set of identifiers (for example, numbers) of the neurons to which this particular neuron is connected, and the magnitude (weight) of the connection, and optionally some flags associated with the connections.

A neural network is defined by three primary factors—the configuration of the individual neurons, the configuration of the connections between the neurons, and the learning process that forms the connections. Also, as noted earlier, conventional neural networks use an iterative approach, where a set of input vectors is supplied to the network, and a set of output vectors is expected in response. The process works iteratively, until the output vectors produced by the neural network match (or are very close to, in some sense) the output vectors that are known to be "correct." This usually takes a number of iterations for each input vector (representing a search query), which is relatively time consuming. In the present approach, only a single iteration is necessary for any input, to generate the "correct" result.

The neurons of the network described herein can be represented by a number of parameters. The first parameter is the ID of the neuron, which is essentially an administrative number used for keeping track of the neuron in the software.

The second parameter is the layer to which this neuron belongs, usually a numeric parameter, such as 1 (words layer), 2 (object layer), 3 (sentence layer), and 4 (document layer). (As a further option, a separate paragraph layer can be added between the sentence layer and the document layer, or, alternatively, instead of sentences, paragraphs can be the basic semantic unit of layer 3.)

Another parameter is the semantic content of each neuron. For example, on the word layer, the semantic content of a neuron is the word itself ("apple," "cider"). On the object layer, the semantic content of each neuron is also a word or a group of words that represents the object or concept. On the sentence layer, the semantic content of each neuron is the sentence in a document. On the document layer, the semantic content of the neuron is the entire document, or some pointer to a document, such as a link or a hyperlink.

Another neuron parameter is the current excitation level of each neuron. This is a numeric value, which can be optionally normalized to be between −1 and +1.

Another parameter (which is optional) is a measure of inertia $K_{ANCHOR}$, or "anchor." One of the issues that such a neural network may need to confront is the fact that some words in some languages often have numerous connections to other words, while others have only a few connections. In the case of words with many connections, those neurons would be easily excited, which in turn leads to a large amount of noise, or "junk stimuli" for other neurons. Therefore, the anchor is a numerical coefficient ranging between 0 and 1, used that makes it more difficult to excite a particular neuron. In essence, the anchor is used to suppress "junk excitation" for words which occur in a language with high frequency.

Another optional parameter is a coefficient of excitation $K_{EX}$, which is a numerical parameter between 0 and 1, and which relates to parts of speech. The default coefficient of excitation $K_{EX}$ may be 1.0 for all words, however, a more sophisticated approach would assign, for example, a coefficient of 1.0 to nouns, a coefficient of (for example) 0.7 to verbs, 0.5 to adverbs, etc. Note also that this complementary to filtering the document for words that normally carry little information, such as articles, prepositions, etc. Also note that, if used, the coefficients of excitation are language-specific, and would most likely be determined by an expert, based on empirical analysis.

Another parameter associated with each neuron is an inhibition coefficient $K_{INH}$. The inhibition coefficient is a measure of how long the neuron will stay excited, in terms of a number of cycles, in the absence of external stimulus. For example, if the current excitation level of the neuron is 1.0, and the inhibition coefficient is 0.5, then on the next cycle, and in the absence of external stimuli to that neuron, the excitation level of that neuron will be 0.5. On the cycle after that it will be 0.25, etc.

Another optional parameter is an exhaustion parameter $K_{EXH}$. This is a numerical value, ranging from 0 to 1, and is a measure of whether the neuron stays active from cycle to cycle, even if external stimuli are present (in other words, in some cases, it may be desirable to suppress the excitation of a particular neuron that otherwise would be excited all the time, even if external stimuli are present).

Another optional parameter is the threshold excitation value. Each neuron can be defined to have an excitation value of 0 if the excitation value is less than a certain threshold. This is also essentially a measure used to suppress noise and both "junk excitation" in the network, ensuring that only those neurons that have genuine relevance to the search are excited. This is also typically a parameter set by an expert based on empirical analysis.

Another parameter an activation function, $f_A$, where any number of different functions can be used, such as step, sigmoid, parabolic, sloping upwards, sloping downwards, etc. The function describes what the output of the neuron should look be given a particular total stimuli input.

Note also that the various parameters discussed above can change dynamically, either through manual intervention, or through the neural network itself changing the parameters. Frequently, the values of the parameters will depend on the level of detail of that the user would like from the search—a search whose over-inclusiveness the user can live with will have less emphasis on suppression of noise and neurons remaining active for an extended period of time. A user who would like to focus the search on only the most relevant results would likely set the coefficient that suppress the activity in various ways at relatively high levels. It is also worth noting that typically such control over the coefficients is done under the guise of some on-screen control, that is presented in a more "user friendly" manner—for example, "scope of search," "level of detail," "number of most relevant results," etc.—these are all in some sense proxies for the parameters of the neural network that the user can set.

In addition to the parameters that relate to the neuron itself, each neuron also retains information relating to the connections that the neuron has. Typically, each neuron maintains the IDs of the neurons to which it is connected. As noted earlier, this is usually a subset of all the neurons, and usually a relatively small subset.

For each such connection, there is a connection weight, ranging between −1 and +1 (or some other number, here, −1 to +1 can be viewed as a normalized value). The connection weight normally changes dynamically, as the neural network evolves. A negative value for the weight of the coefficient represents an inhibition, or damping, of the excitation, a positive number represents an increase in the excitation. A zero may be viewed as a lack of connection between two neurons, meaning that they are never found in the same context.

Optionally, each connection can have various flags associated with it. One such flag may relate to suppression of the connection—for example, even if the connection is formed, the user can "kill" the connection. One example would be in computer-related searches, the connection between "apple" and "fruit" would be suppressed, or killed, even though documents may be found that connect "apple" to "fruit" and such a connection would otherwise have a non-zero weight.

Another flag can be a "do not change" flag, which forces the connection wait to remain constant, notwithstanding the evolution of the neural network.

Another flag can be "do not create" flag, which would prevent formation the connection even though the neural network would otherwise want to form it.

This organization permits generation of a neural network of an arbitrarily large size, but at the same time permits very rapid forward and back propagation of information within the neural network.

Preferably, at the output, the value can range between +1 and −1 (these numbers can also be viewed as normalized values). Most commonly, output values in the range of zero to +1 are used to identify relevant documents (typically, this represents documents or concepts that have at least some relevance to the user's query, whereas documents associated with negative values of the output typically represent those that are specifically identified as being the "opposite" in some sense of what the user is looking for).

To calculate the activity within the network, two intermediate values are used—excitation activity, and inhibition activity. These values correspond to the excited/inhibited neurons in the network. Recalculation of the activity is done as follows:

For each neuron whose excitation value is non-zero, and for each connection of such neuron, that neuron transmits its own "level of activity" (excitation or inhibition) through its connections to those neurons to which it is connected.

Next, the current excitation level Excitation Level [T] of each neuron is calculated as according to the equation Excitation Level[$T$] = [Equation 1]

$$a * \sum^+ - b * \sum^- + \text{Excitation Level}[T-1] * K_{INH}$$

Output=$f_A$(Excitation Level[$T$]*$K_{EX}$) if >Threshold else

Output=0 if <Threshold [Equation 2]

where Output is the output value of the neuron's excitation;
Excitation Level [T−1] is the excitation value of this neuron on the previous cycle;
$f_A$ is the activation function, where any number of different functions can be used, such as step, sigmoid, parabolic, sloping upwards, sloping downwards, etc.;

$K_{INH}$ is the coefficient of dampening, or inhibition (which characterizes behavior of a neuron in the absence of an external input);

$K_{EX}$ is the excitation coefficient relating to the part of speech;

Threshold value is the minimum value of the excitation needed to activate the neuron;

$\overset{+}{\Sigma}$ is the sum of the values of the excitation activity of the neurons to which this neuron is connected, multiplied by the weight of the corresponding connection;

$\overset{-}{\Sigma}$ is the sum of the values of the inhibition activity of the neurons to which this neuron is connected, multiplied by the weight of the corresponding connection; and a and b are coefficients.

Equation 1 above can be written in a more general form as follows:

Excitation Level[$T$] = [Equation 3]

$$\left( a * \sum^+ - b * \sum^- + \text{Excitation Level}[T-1] * K_{INH} \right) * K_{EXH} * K_{ANCHOR}$$

Alternatively, this equation can be written as:

$$\text{Excitation Level}[T] = \left( a * \sum^+ - b * \sum^- \right) * K_{EXH} * K_{ANCHOR} + \text{Excitation Level}[T-1] * K_{INH}$$ [Equation 4]

where $K_{ANCHOR}$ is the inertia coefficient, and
$K_{EXH}$ is the exhaustion parameter.

To enable the neural network to function better, an Activity Regulator is used. In essence, the Activity Regulator is designed to maintain the overall activity within the neural network in a certain range. Once the overall activity is higher than a predetermined level, the activity of all the neurons is proportionately decreased. Similarly, if the overall activity is too low, it can be raised.

There are a number of Activity Regulators that can be used. For example, the Activity Regulator can maintain a maximum number of neurons of the network that are excited (e.g., 10% of the total).

Furthermore, an excited neuron can transmit an inhibiting value to the next level, if this neuron is related to concepts on that level that the user specifically wants to exclude. Furthermore, to improve the performance of the system, and to improve the ability to define context for document searching, a set of active neurons is used. This set contains the identifiers of the neurons that can be excited at any given moment in time. Depending on the mode of operation, neurons can be added to this set, or not. Note furthermore that the neural network functions in a discrete manner—in other words, a change in the activity level of the neural network can occur only on a "clock cycle." This network organization allows efficient searching through documents, such as, for example, text documents.

In the case of an under-excited network, i.e., one where virtually no neurons have been sufficiently excited, the Activity Regulator can be used to increase the overall level of activity, in the hope that neurons that are only weakly excited can be stimulated to a point where the network begins to function properly. The Activity Regular can maintain a minimum number of neurons, e.g., 1%, that are excited.

To effectively manage searching using neural networks, a necessary step is the conversion of text into various elements of the neural network. In a preferred embodiment, the network consists of several layers. The first layer is the word layer—here, each neuron corresponds to one word from a dictionary. For example, the word "apple," on the first (word) layer (which has at least three meanings—Apple Computer, apple the fruit, and Adam's apple) has a single neuron.

An object layer (which is not, strictly speaking, necessary, but helps with performance) has neurons that correspond to identified objects and their properties. Here, the word "apple" of layer 1 corresponds to three neurons in layer 2—a neuron associated with the "object" Apple Computer, a neuron associated with the object apple (the fruit), and a neuron that refers to the object "Adam's apple." This layer also can have word combinations as neurons. Note also that the object layer can be formed using dictionaries of objects, and, in the most comprehensive and most detailed case, would have a separate object for each possible meaning of the word—in other words, "apple" can be associated with hundreds of possible objects (fruit, computer, Macintosh—the computer, Macintosh the apple fruit, Big Apple, "the apple of my eye", "John's apple", "Mary's apple," etc.). This can be done based on "dictionaries" of objects. The more detailed the object layer, the more likely the neural network to give a focused, relevant result as the first few entries. At the other extreme, the object layer can be initially formed using simply the words encountered in a document—as such, a single object "apple" would be associated with multiple possible meanings.

Layer 2 is also optional, and so is the sentence layer (layer 3). In this layer, each neuron corresponds to a sentence in a document.

The fourth layer is a document layer, where each neuron in this layer corresponds to an indexed document. This layer is also optional, and, in fact, it is possible to have only a single layer, with the appropriate connections between the neurons. However, conceptually, it is easier to visualize the topology of the neural network in the form of multiple layers. Furthermore, the division into layers is to some extent arbitrary, since some word combinations can be put into layer 2 or layer 3, depending on the task. In many cases, two layers, a word layer and a document layer, are sufficient for effectively searching through the document. The connections can be formed in either direction (forward and back), and excitation/inhibition can propagate both forward (layer 1 to layers 2, 3 and 4, from layer 2 to layers 3 and 4, etc.) and back (from layer 4 to layers 3, 2, 1, from layer 3 to layers 2 and 1, etc.). Furthermore, it will be appreciated that the network can be implemented (in minimal form) using either the word layer and the document layer (layer 4), or using the word layer and the sentence layer, since the documents can be reconstructed from the sentence layer. The network is a bidirectional network, since connections can be oriented from layer 1 to 2, 3, 4, from layer 2 to 3, 4, etc., as well as from layer 4 to 1, 2, 3, from layer 3 to 1, 2, etc.

In one embodiment, the neural network is formed as follows:

(1) Convert document to plain text, to remove formatting artifacts.

(2) Parsing—the text of a document needs to be converted to a structure: paragraph/sentences/word index. At this stage, the text is replaced. In other words, words are replaced with indices (numbers of the words in the index). For example, the text "we welcome participants in this competition" can be replaced by "246 354 86543 348 275 19". Parsing can also include a morphological aspect, in other words, various morphological variations of the same word (America, American, Americans, americanize) can have the same index value (or, in the absence of morphological analysis, different indices).

(3) Filtering—words that have no significant meaning, articles, prepositions, etc. can be removed.

(4) Based on stable word combinations, and based on statistical analysis of frequency of the words, a dictionary of word combinations can be formed. Thus, indices of single words can be replaced by a single index of the word combination. For example, the word combination "airline safety" could be represented by as "2567 37942", and after identifying the word combination, as only a single neuron with an index (e.g.) "29974".

(5) The word layer of the neural network is then formed—i.e., based on the words and the word combinations identified previously, a necessary number of neurons is created, and each such neuron is associated with a word or word combination. For example, if a document has 1000 words and word combinations, then the word layer of the neural network will have 1000 elements. As the neural network continues to learn, additional neurons can be added to the word layer, as the new words are encountered.

(6) Connections between the neurons are then formed, based on the formula $W_{ij}=W_{ij}+F(L_{ij})$, where $W_{ij}$ is the connection between neuron i and neuron j, and $F(L_{ij})$ is the function of the "distance" between neurons i and j. In other words, the more frequently the closer the two words occur in the text, and the more common such occurrences, the larger the value of the function $F(L_{ij})$. Also, a connection formed in one document, but not found in any others should have its weight reduced, since such a connection is likely not a "real" connection. This will have a corresponding decrease in the weights of the connections of other neurons related to this neuron/connection. Similarly, an increase in the excitation of one neuron will lead to an increase in the weights of the connections of other neurons that are related to this neuron/connection. Alternatively, when one connection's weight is increased, the weights of other connections of that neuron are decreased (and vice versa).

(7) Other layers are then formed, for example, the object layer, the sentence layer, and the document layer, and the connections between these layers and the word layer are identified. This can be done based on the equation $W_{ij}=f(N_i)$, where $W_{ij}$ is the connection between the word i and the sentence j; and $f(N_i)$ is the function of the frequency of occurrence of the word i in the sentence j. Similarly, the frequency of occurrence of the sentences in the documents (if there are multiple documents) can be used to establish the values of the coefficients W (i.e., the weight of the connections) between the relevant neurons.

The parsing process can also generate dynamic models, which identifies not just words in the text, but their meaning and more complex concepts associated with them. For example, a sentence "As a result of the parliamentary elections, the winner was . . . " can result in connections between this sentence and neurons that represent the words "electorate," "campaign," "race," "party platform," etc. In other words, the connections can be established not just between words, but also between concepts that are themselves not mentioned in the given sentence.

The source of information for the neural network can be text (or other types of documents) of various formats, databases, specialized information systems (for example, magazines, articles, publications dedicated to a particular field of endeavor, etc.), documents management and document exchange systems, etc. To extract text from these sources, various format converters can be used, for example, converting MS Word, pdf, rtf, and other types of formats to text so that the text can then be parsed, as discussed above. Various filters can be used to extract words and morphological variations, which can be particularly useful to reduce the overall number of neurons in the network.

Initially, the neural network does not contain meaningful elements, but is only defined by the number of layers used. During the indexing process, each new word is added to the word layer of the neural network. Also, at the time that the new word is added, at least some (though not necessarily all) connections between that new word, and the other neurons of the word layer and the neurons of other layers, can be identified. When the same new word is encountered again, the weights of the corresponding connections, which represent how "close" the words are contextually, can be updated. For example, the weight of the connections increases if the relationship between new word i and word j reoccurs in the document.

At the same time, objects can be identified from such multiple connections between the neurons of the word layer and the neurons of the object layer. Also, as additional documents are indexed, sentence neurons can be added to the sentence layer, with the connections to the word and the object layer neurons. Similarly, the document layer is updated. Thus, the structure as shown in FIG. 1 is generated.

Figure 2:
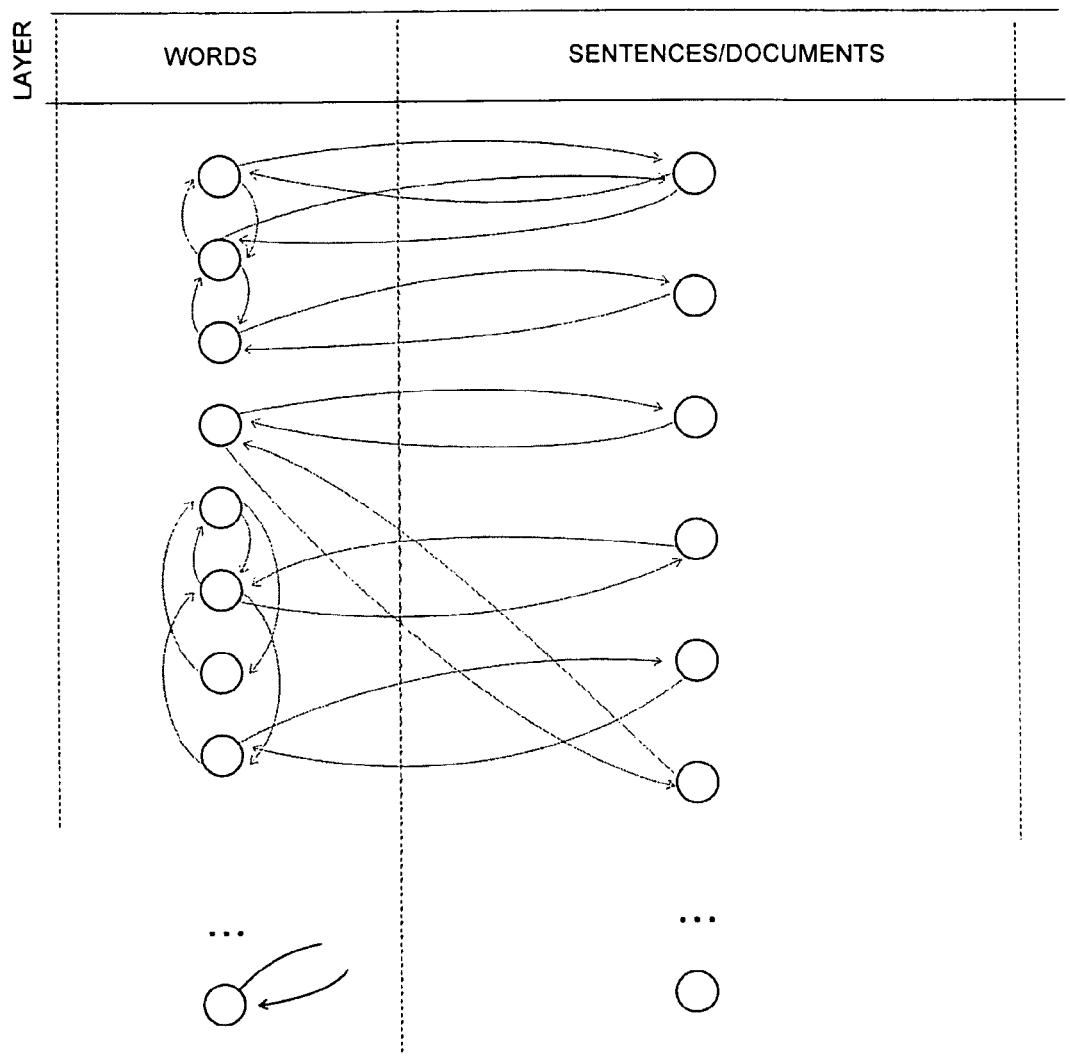
FIG. 2 shows a simplified neural network to which the network of FIG. 1 can be reduced.

In the simplest case, the structure of FIG. 2 is generated. In this case, the neural network has only two layers: word layer, and sentence/document layer, or, even simpler, just a word layer and a document layer. This simplifies the programming task somewhat, but conceptually the "fruit" the word and "fruit" the concept have to be both placed on layer 1. It is expected that more robust versions of the neural network, such as illustrated in FIG. 1, are preferred.

Figure 3A:
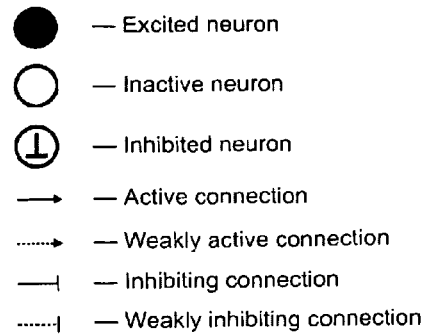
FIGS. 3A-3E illustrate the dynamics of using a neural network, such as illustrated in FIG. 1.
Figure 3A:
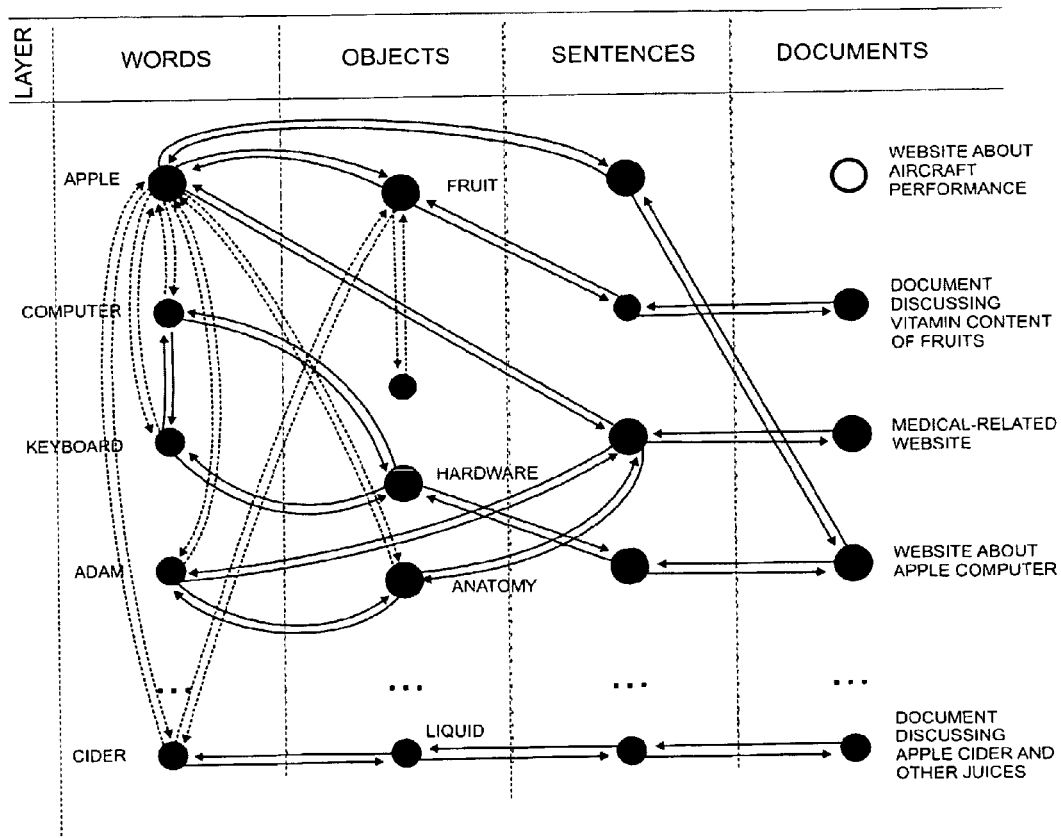
Figure 3B:
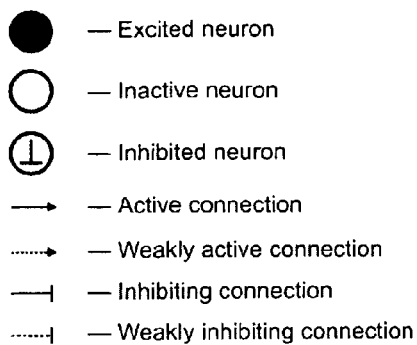
Figure 3B:
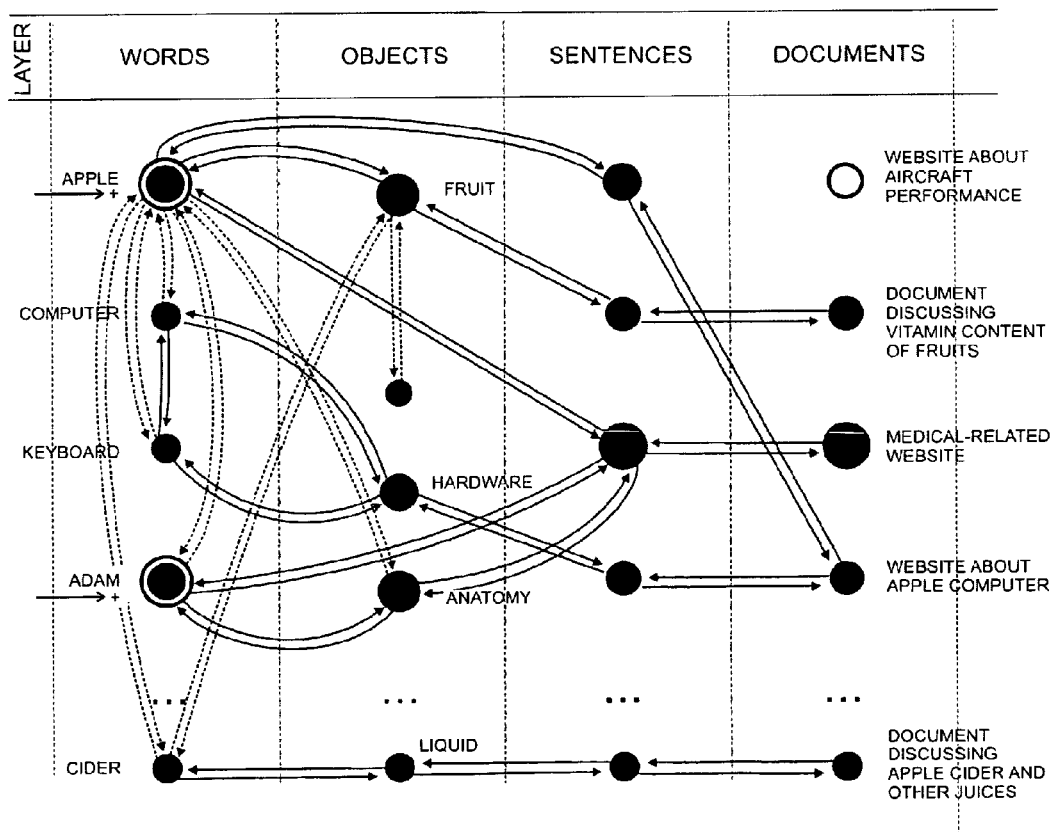

FIGS. 3A-3E illustrate the dynamics of using a neural network, such as illustrated in FIG. 1. In FIG. 3A, the user "excites" the network with the word "apple," which activates "fruit," "hardware" and "anatomy" neurons on the object layer, representing the concepts, some neurons on the sentence layer, and some neurons on the document layer. In FIG. 3B, the user indicates relevance of the "apple" neuron and the "Adam" neuron. This change propagates through the network, making some neurons more relevant than before.

Figure 3C:
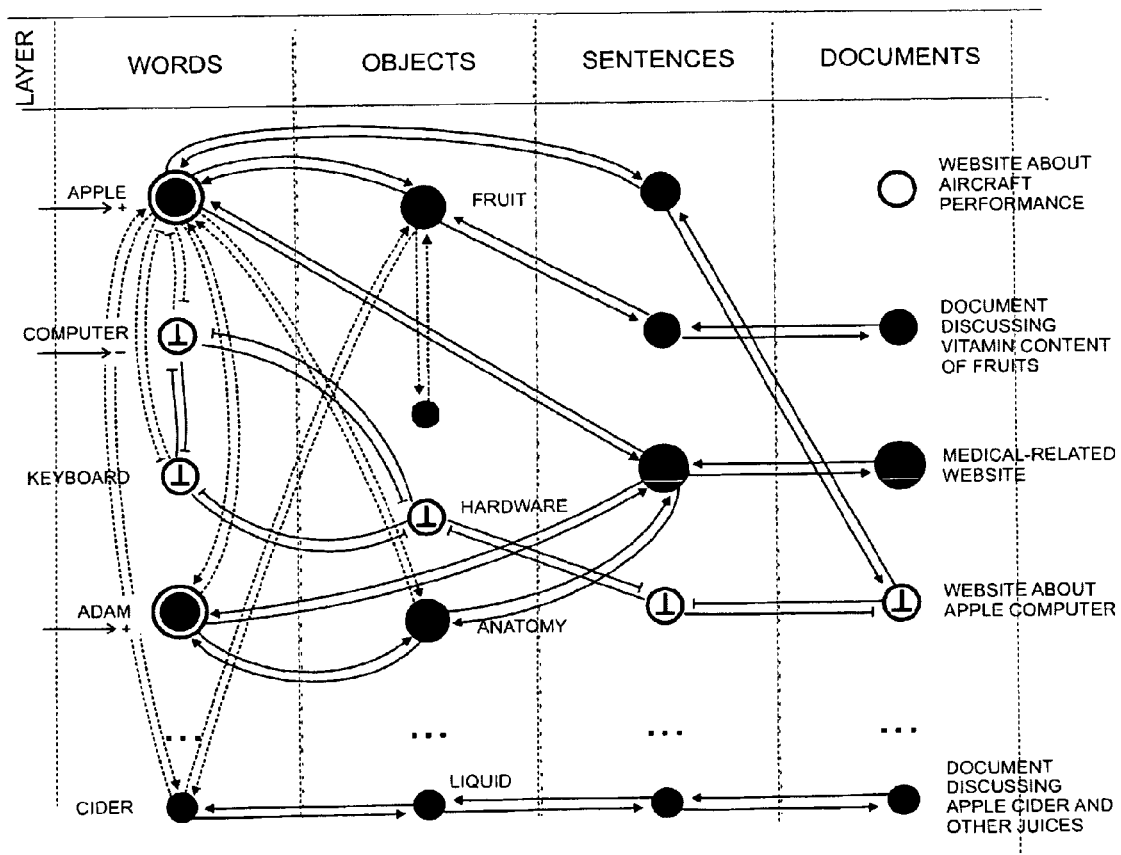
Figure 3D:
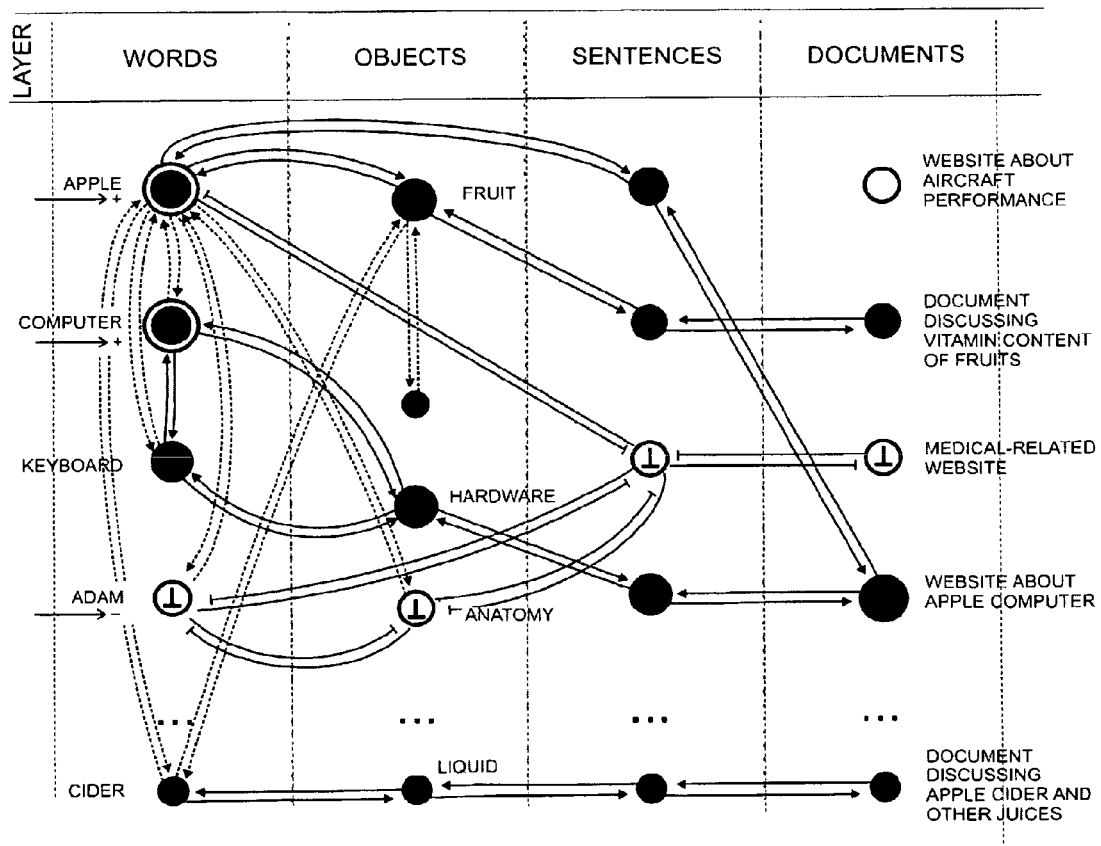
Figure 3E:
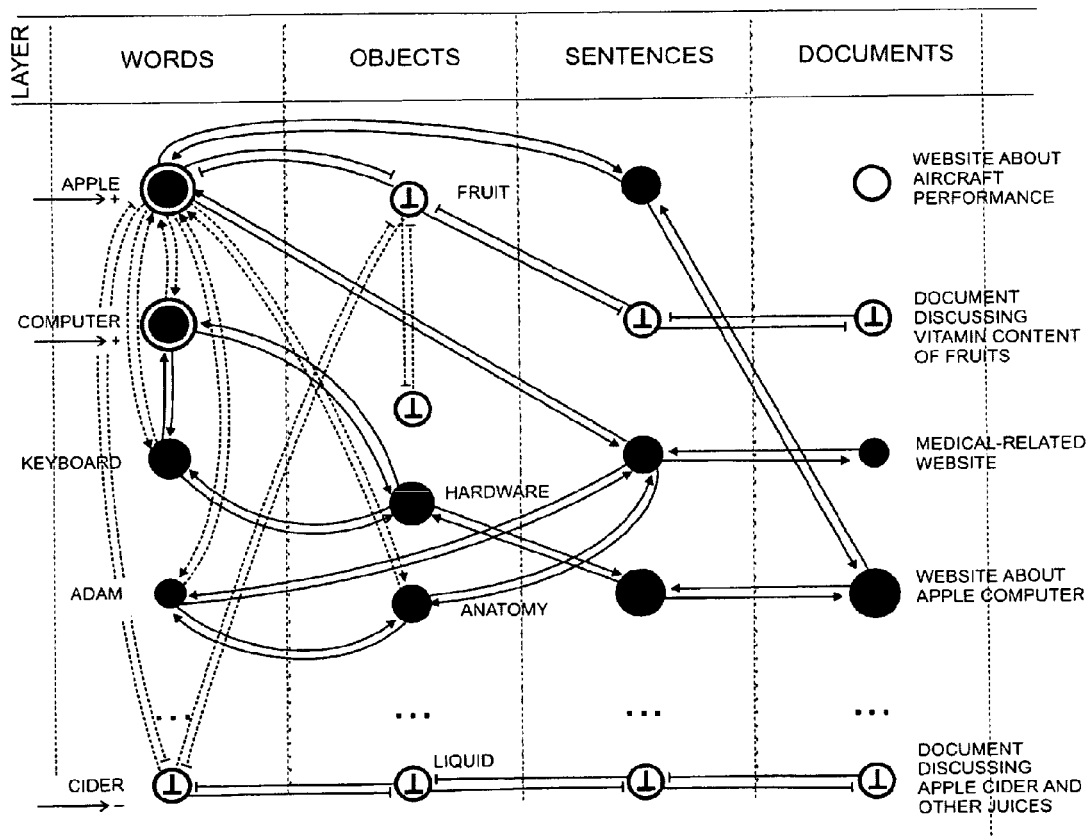

In FIG. 3C, the user indicates irrelevance of one of the documents (see dashed neuron and dashed lines). This change back-propagates through the network again, lowering the relevance of some of the previously identified neurons on the sentence, object and word layers (i.e., inhibiting some neurons). FIG. 3D shows how additional neurons (e.g., "anatomy" and "Adam") are inhibited. FIG. 3E shows how the user can inhibit (indicate irrelevance) of some of the documents (for example, documents discussing fruit dishes and documents discussing cider drinks), and the change therefore propagates back through the network, leaving only the desired documents identified. Other options, in addition to the user modifying the weight of the neuron based on relevance of that neuron include removal or addition of connections, or manual modification of the weights of the connections (not shown in these figures).

Figure 4:
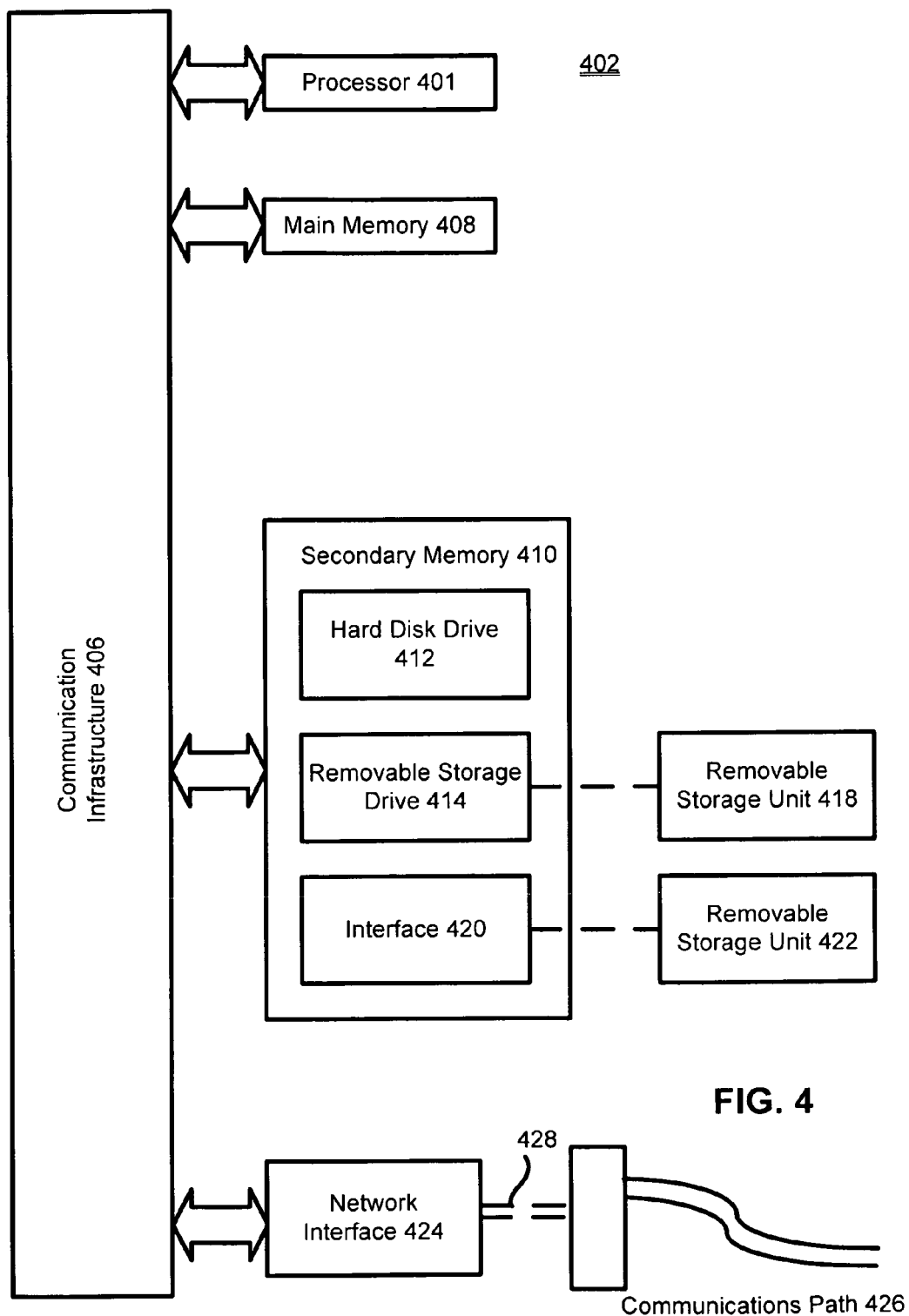
FIG. 4 illustrates an example of a computer system where the neural network can be implemented.

An example of the computer 402 on which the neural network can be implemented is illustrated in FIG. 4. The computer 402 includes one or more processors, such as processor 401. The processor 401 is connected to a communication infrastructure 406, such as a bus or network). Various software implementations are described in terms of this exemplary computer system. After reading this description, it will become apparent to a person skilled in the relevant art how to implement the invention using other computer systems and/or computer architectures.

Computer 402 also includes a main memory 408, preferably random access memory (RAM), and may also include a secondary memory 410. The secondary memory 410 may include, for example, a hard disk drive 412 and/or a removable storage drive 414, representing a magnetic tape drive, an optical disk drive, etc. The removable storage drive 414 reads from and/or writes to a removable storage unit 418 in a well known manner. Removable storage unit 418 represents a magnetic tape, optical disk, or other storage medium that is read by and written to by removable storage drive 414. As will be appreciated, the removable storage unit 418 can include a computer usable storage medium having stored therein computer software and/or data.

In alternative implementations, secondary memory 410 may include other means for allowing computer programs or other instructions to be loaded into computer 402. Such means may include, for example, a removable storage unit 422 and an interface 420. An example of such means may include a removable memory chip (such as an EPROM, or PROM) and associated socket, or other removable storage units 422 and interfaces 420 which allow software and data to be transferred from the removable storage unit 422 to computer 402.

Computer 402 may also include one or more communications interfaces, such as communications interface 424. Communications interface 424 allows software and data to be transferred between computer 402 and external devices. Examples of communications interface 424 may include a modem, a network interface (such as an Ethernet card), a communications port, a PCMCIA slot and card, etc. Software and data transferred via communications interface 424 are in the form of signals 428 which may be electronic, electromagnetic, optical or other signals capable of being received by communications interface 424. These signals 428 are provided to communications interface 424 via a communications path (i.e., channel) 426. This channel 426 carries signals 428 and may be implemented using wire or cable, fiber optics, an RF link and other communications channels. In an embodiment of the invention, signals 428 comprise data packets sent to processor 401. Information representing processed packets can also be sent in the form of signals 428 from processor 401 through communications path 426.

The terms "computer program medium" and "computer usable medium" are used to generally refer to media such as removable storage units 418 and 422, a hard disk installed in hard disk drive 412, and signals 428, which provide software to the computer 402.

Computer programs are stored in main memory 408 and/or secondary memory 410. Computer programs may also be received via communications interface 424. Such computer programs, when executed, enable the computer 402 to implement the present invention as discussed herein. In particular, the computer programs, when executed, enable the processor 401 to implement the present invention. Where the invention is implemented using software, the software may be stored in a computer program product and loaded into computer 402 using removable storage drive 414, hard drive 412 or communications interface 424.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for information searching, comprising:
a processor configured to:
implement a first layer comprising a first plurality of neurons, each of the first plurality of neurons being associated with a word and with a first set of dynamic connections to at least some of the first plurality of neurons; and
implement a second layer comprising a second plurality of neurons, each of the second plurality of neurons being associated with a sentence, and with a second set of dynamic connections to at least some of the first plurality of neurons;
wherein the first set of dynamic connections and the second set of dynamic connections are configured such that a query of at least one neuron of the first plurality of neurons excites at least one neuron of the second plurality of neurons, and
wherein the excited at least one neuron of the second plurality of neurons is contextually related to the queried at least one neuron of the first plurality of neurons.

2. The system of claim 1, further comprising a third layer comprising a third plurality of neurons, each of the third plurality of neurons being associated with an object, with a third set of dynamic connections to at least some of the first plurality of neurons, and with a fourth set of dynamic connections to at least some of the second plurality of neurons.

3. The system of claim 1, wherein each dynamic connection comprises a weight.

4. The system of claim 1, wherein the first plurality of neurons and the second plurality of neurons form a bidirectional neural network.

5. The system of claim 1, further comprising an activity regulator, wherein, if overall network activity of the first plurality of neurons and the second plurality of neurons is above a predetermined threshold, excitation levels of each of the first plurality of neurons and the second plurality of neurons is reduced proportionately.

6. The system of claim 1, further comprising an activity regulator, wherein, if overall network activity of the first plurality of neurons and the second plurality of neurons is below a predetermined threshold, excitation levels of each of the first plurality of neurons and the second plurality of neurons is increased proportionately.

7. The system of claim 1, wherein each of the first plurality of neurons and the second plurality of neurons comprises at least one parameter including at least one of: an anchor coefficient, an inhibition coefficient, an excitation coefficient and an exhaustion coefficient.

8. The system of claim 1, wherein at least one of the first set of dynamic connections comprise a flag indicating at least one of a zero weight, a constant weight, and an indication to stop formation of a connection.

9. The system of claim 1, wherein each of the second plurality of neurons is associated with at least one of a hyperlink and an annotation.

10. The system of claim 1, wherein at least one neuron of the first plurality of neurons is inhibited.

11. The system of claim 1, wherein a weight of an associated dynamic connection of the first set of dynamic connections is configured to increase when the associated dynamic connection is associated with a selected neuron of the second plurality of neurons.

12. The system of claim 2, wherein a weight of an associated dynamic connection of the third set of dynamic connections is configured to increase when the associated dynamic connection is associated with a selected neuron of the third plurality of neurons.

13. A method for information searching, comprising:
parsing a plurality of documents to identify words and sentences;
associating the identified words with word neurons;
associating the sentences with sentence neurons; and
forming connections amongst the word neurons and the sentence neurons, wherein each of the word neurons and the sentence neurons is connected to a subset of the other neurons, and wherein each connection comprises a weight based on a frequency of occurrence of each identified word
wherein the connections are configured such that a query of a word neuron excites at least one sentence neuron, and
wherein the excited sentence neuron is contextually related to the queried word neuron.

14. The method of claim 13, further comprising converting the documents to text format.

15. The method of claim 13, further comprising filtering the documents.

16. The method of claim 13, wherein
the word neurons comprise a first layer and the sentence neurons form a second layer.

17. The method of claim 13, further comprising:
forming connections amongst the word neurons and object neurons; and
forming connections amongst the sentence neurons and the object neurons;
wherein the object neurons are based on a dictionary of objects.

18. The method of claim 13, wherein each of the sentence neurons is associated with at least one of a hyperlink and an annotation.

19. The method of claim 13, wherein a weight of an associated connection of the connections is configured to increase when the associated connection is associated with a selected neuron of the sentence neurons.

20. The method of claim 13, wherein a weight of an associated connection of the connections is configured to decrease when the associated connection is associated with a selected neuron of the sentence neurons.

21. The method of claim 13, wherein the weight is based on a frequency of a distance between words in the plurality of documents.

22. An article of manufacture including a computer-readable medium having instructions stored thereon that, if executed by a computing device, cause the computing device to perform operations, comprising:
parsing a plurality of documents to identify words and sentences;
associating the identified words with word neurons;
associating the sentences with sentence neurons; and
forming connections amongst the word neurons and the sentence neurons, wherein each of the word neurons and the sentence neurons is connected to a subset of the other neurons, and wherein each connection comprises a weight based on a frequency of occurrence of each identified word;
wherein the connections are configured such that a query of a word neuron excites at least one sentence neuron, and
wherein the excited sentence neuron is contextually related to the queried word neuron.

23. The article of manufacture of claim 22, further comprising instructions for converting the documents to text format.

24. The article of manufacture of claim 22, further comprising instructions for filtering the documents.

25. The article of manufacture of claim 22, wherein the word neurons comprise a first layer and the sentence neurons form a second layer.

26. The article of manufacture of claim 22, further comprising instructions for:

forming connections amongst the word neurons and object neurons; and forming connections amongst the sentence neurons and the object neurons;

wherein the object neurons are based on a dictionary of objects.

27. The article of manufacture of claim 22, wherein each of the sentence neurons is associated with at least one of a hyperlink and an annotation.

28. The article of manufacture of claim 22, wherein a weight of an associated connection of the connections is configured to increase when the associated connection is associated with a selected neuron of the sentence neurons.

29. The article of manufacture of claim 22, wherein a weight of an associated connection of the connections is configured to decrease when the associated connection is associated with a selected neuron of the sentence neurons.

30. The article of manufacture of claim 22, wherein the weight is based on a frequency of a distance between words in the plurality of documents.

* * * * *

UNITED STATES PATENT AND TRADEMARK OFFICE
CERTIFICATE OF CORRECTION

PATENT NO. : 7,979,370 B1  
APPLICATION NO. : 12/362017  
DATED : July 12, 2011  
INVENTOR(S) : Ershov Page 1 of 1

It is certified that error appears in the above-identified patent and that said Letters Patent is hereby corrected as shown below:

Column 14, line 14, in Claim 13, delete "word" and insert -- word; --.

Signed and Sealed this  
Twenty-seventh Day of December, 2011

David J. Kappos  
*Director of the United States Patent and Trademark Office*